Nov. 29, 1960  G. A. FROJD  2,961,764
METHOD OF MAKING UNIVERSAL JOINT SPIDERS
Filed Jan. 30, 1956  9 Sheets-Sheet 1

Inventor:
Gustav A. Frojd
By A. J. Schmid Atty.

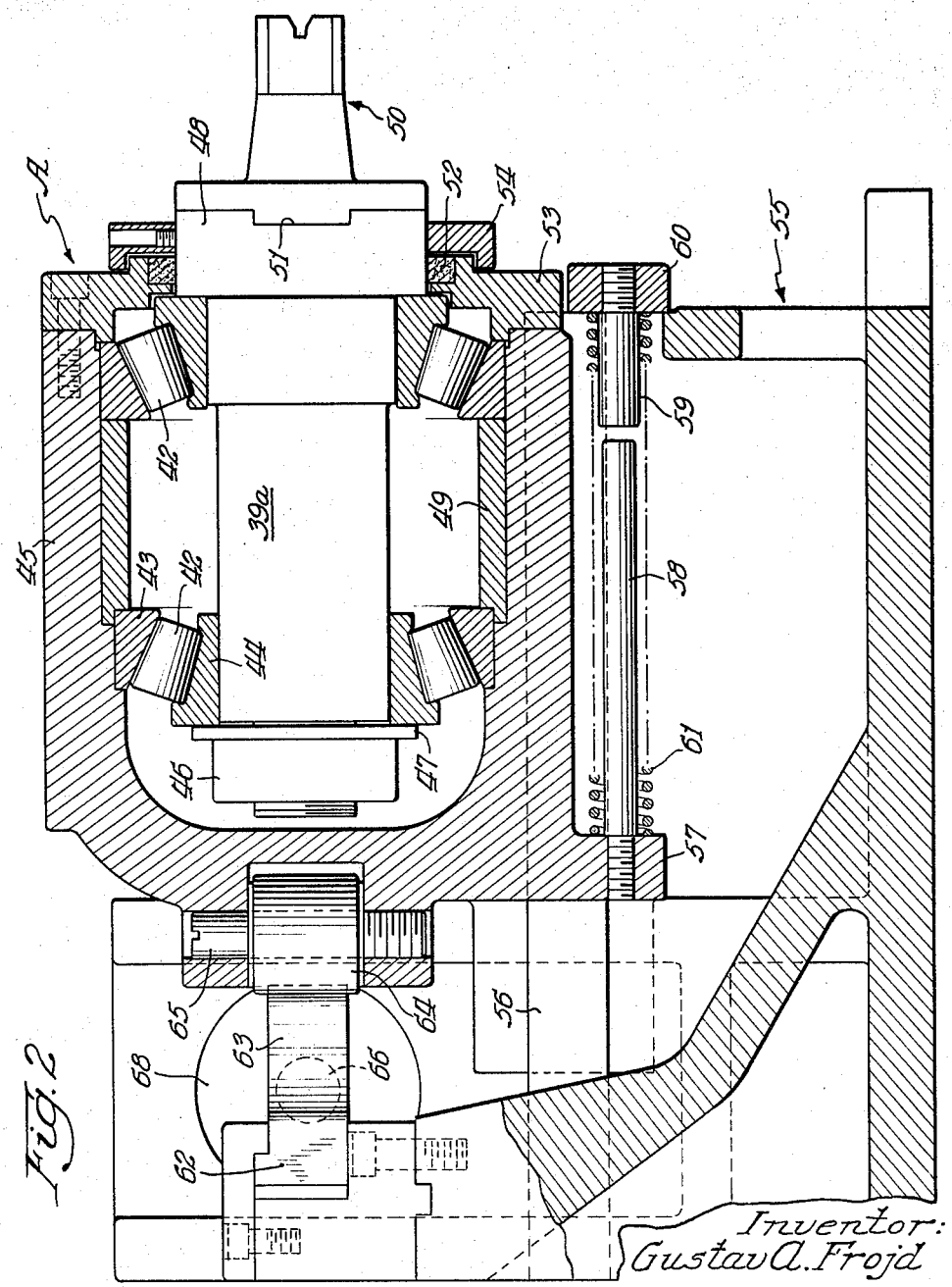

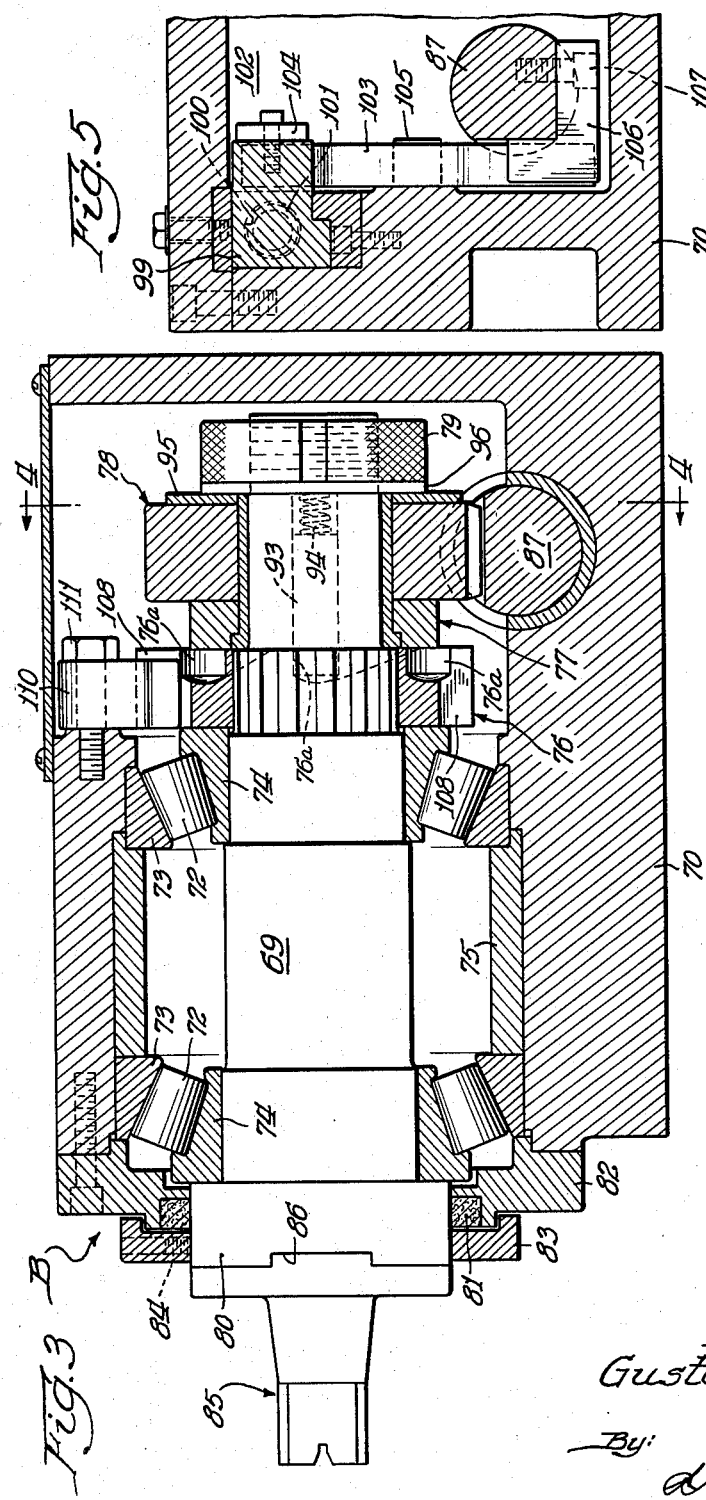

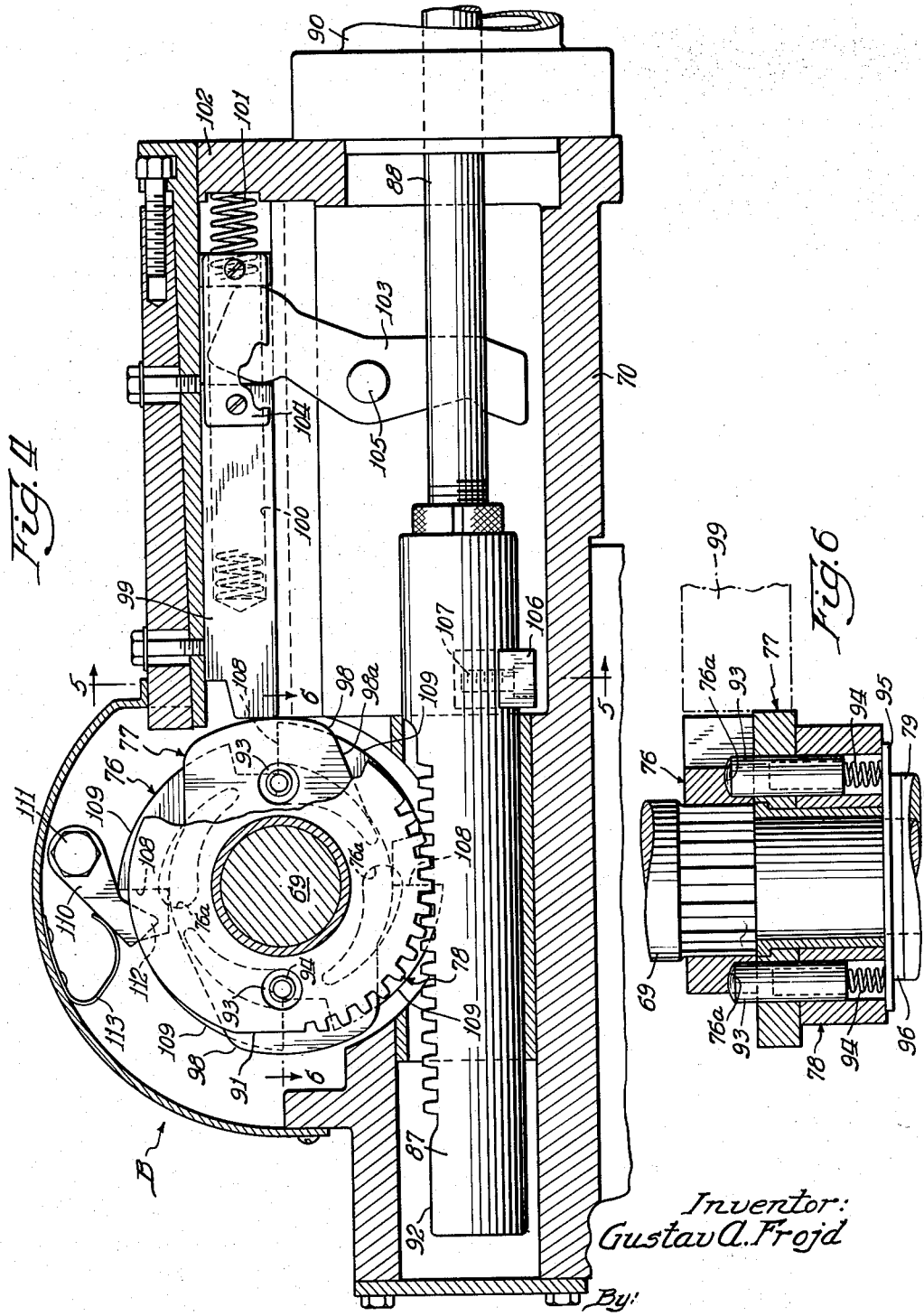

Nov. 29, 1960    G. A. FROJD    2,961,764
METHOD OF MAKING UNIVERSAL JOINT SPIDERS
Filed Jan. 30, 1956    9 Sheets-Sheet 5
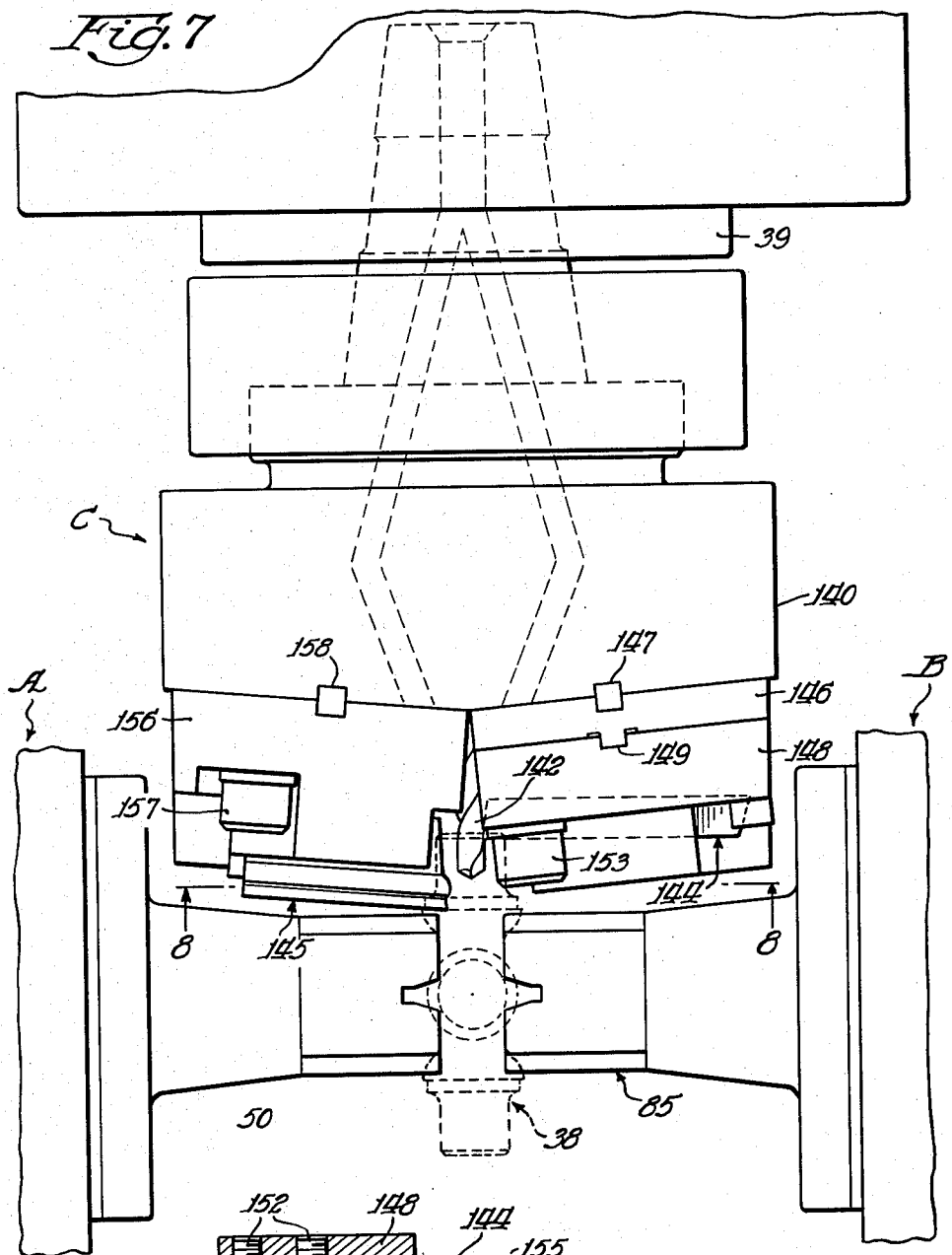
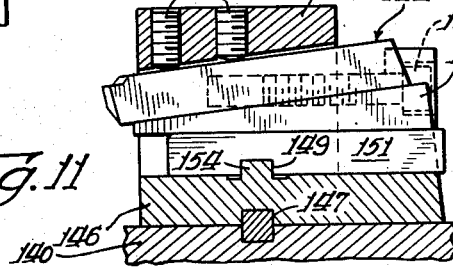
Inventor:
Gustav A. Frojd

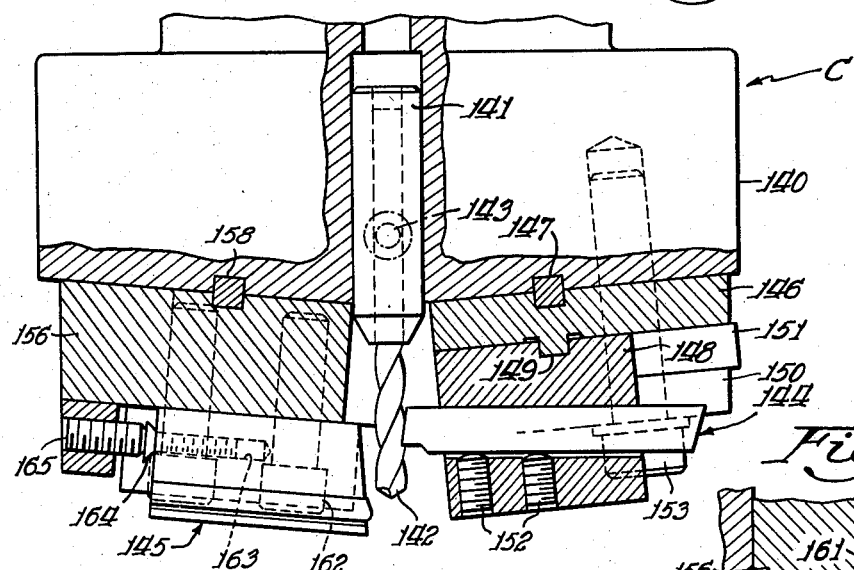
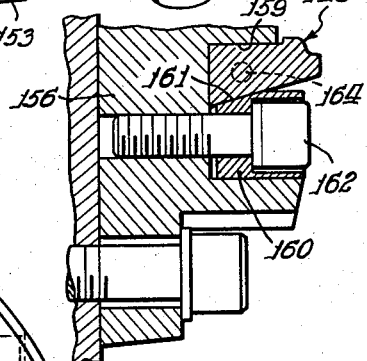
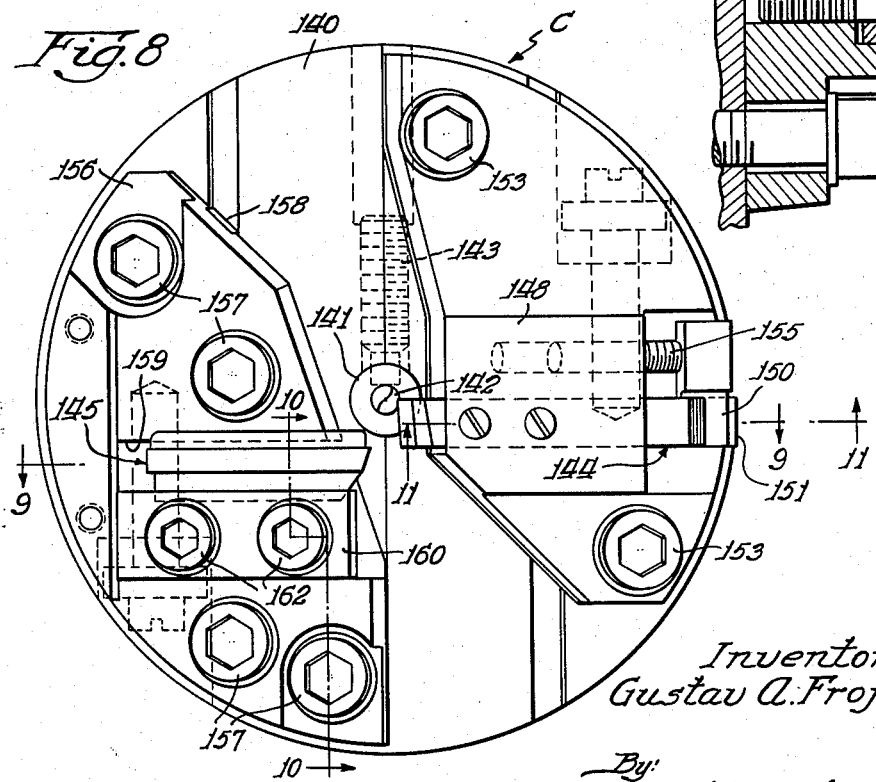

Nov. 29, 1960  G. A. FROJD  2,961,764
METHOD OF MAKING UNIVERSAL JOINT SPIDERS
Filed Jan. 30, 1956  9 Sheets-Sheet 7
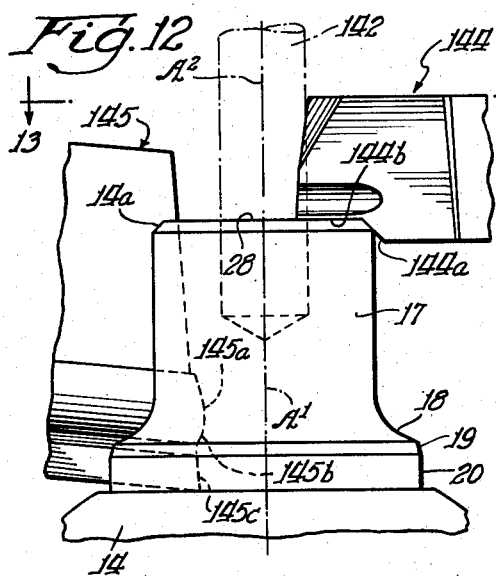
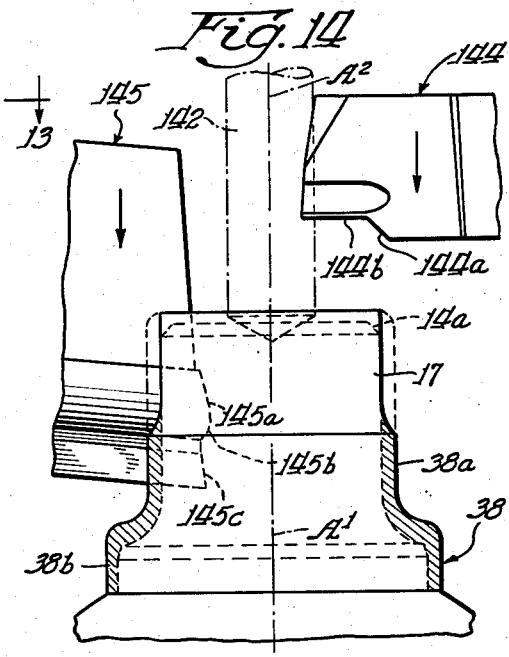
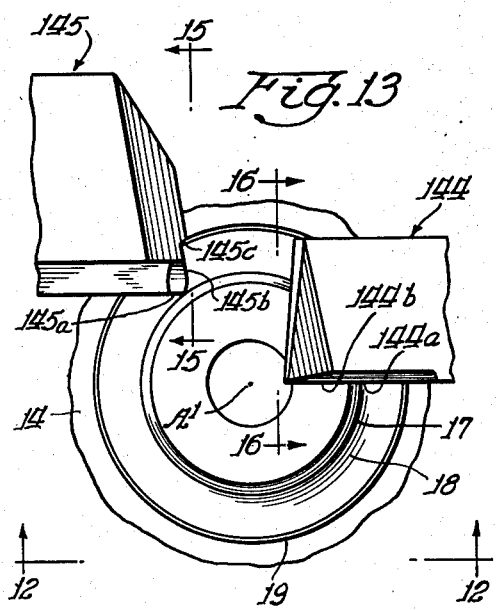
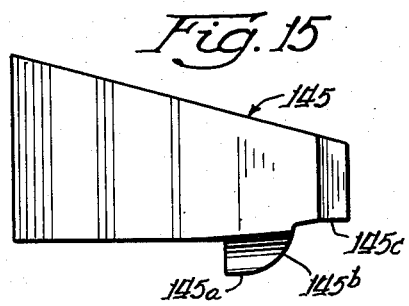
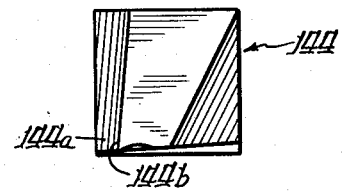
Inventor:
Gustav A. Frojd
By:

Nov. 29, 1960   G. A. FROJD   2,961,764
METHOD OF MAKING UNIVERSAL JOINT SPIDERS
Filed Jan. 30, 1956   9 Sheets-Sheet 8
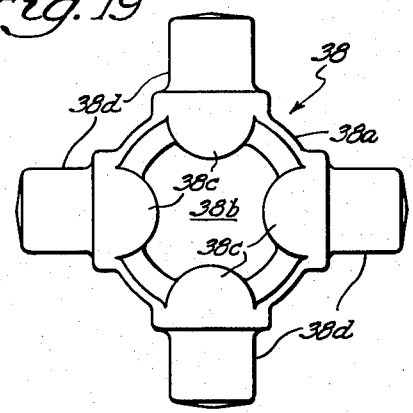
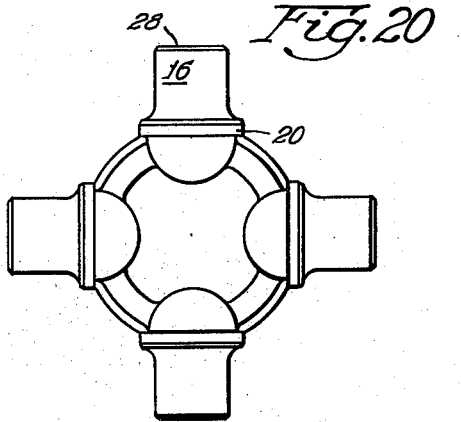
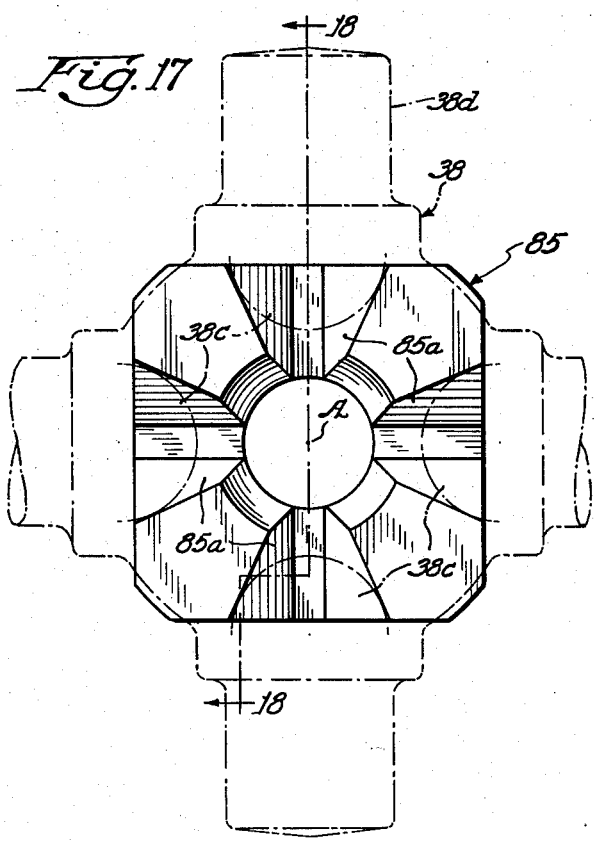
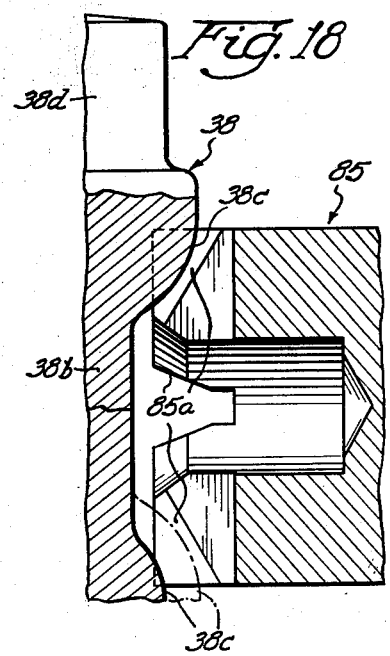
Inventor:
Gustav A. Frojd
By:
H. J. Schmid   Atty.

Nov. 29, 1960  G. A. FROJD  2,961,764
METHOD OF MAKING UNIVERSAL JOINT SPIDERS
Filed Jan. 30, 1956  9 Sheets-Sheet 9

Inventor:
Gustav A. Frojd
By: K. J. Schmid Atty.

United States Patent Office 2,961,764
Patented Nov. 29, 1960

2,961,764

METHOD OF MAKING UNIVERSAL JOINT SPIDERS

Gustav A. Frojd, Rockford, Ill., assignor to Borg-Warner Corporation, Chicago, Ill., a corporation of Illinois Filed Jan. 30, 1956, Ser. No. 562,372

5 Claims. (Cl. 29—558)

This invention relates to a method of and apparatus for manufacturing spiders or cross members for universal joints of the general type in which the spiders have diametrically spaced pairs of trunnions each having cylindrical walls providing bearing surfaces for roller bearings disposed between the surfaces and bearing cups each wall having a flared portion at the base of the trunnion to accommodate a lubricant-seal, and the end of the trunnion having a flat bearing surface engaging the cup and an axially extending hole for lubricant storage.

Universal joints of the kind described have presented difficult problems in the manufacture of the spiders. The production of these spiders by conventional methods and apparatus involved considerable costs, especially where it was attempted to accurately machine the trunnions of rough forged spiders to the close tolerances required to insure the uniformity of the angular and planar positions of the machined trunnions, proper diameters and correct axial location of the cylindrical bearing surfaces of the trunnions, and disposition of the end bearing surfaces equidistantly from the axis of the spider. It is, therefore, the principal object of the invention to provide an improved and simplified method of and apparatus for the manufacture of spiders in accordance with which the spider forgings are located and positioned for rotation about a fixed axis and periodically indexed 90 degrees to dispose each trunnion axis in alignment with the axis of a reciprocating and rotatable cutting head, the head being movable along its axis and carrying cutting tools effective to machine the trunnions to provide the end and cylindrical bearing surfaces and the flared portion at the base of the trunnion in a single operation, thereby making it possible to produce the spiders to closer machining tolerances and accuracy than hitherto considered feasible in quantity production and at a fraction of the cost otherwise involved.

In the following description, reference is made to the accompanying drawings, in which:

Fig. 2 is a transverse vertical sectional view of the clamping mechanism, taken on line 2—2 of Fig. 1;

Fig. 3 is a transverse vertical sectional view of the indexing mechanism, taken on line 3—3 of Fig. 1;

Fig. 4 is a sectional view taken on line 4—4 of Fig. 3 and illustrating the cam arrangement of the indexing mechanism;

Fig. 5 is a sectional view taken on line 5—5 of Fig. 4;

Fig. 6 is a sectional view taken on line 6—6 of Fig. 4;

Fig. 7 is an enlarged top plan view of the arbors of the clamping and indexing mechanisms and cutting head of the apparatus;

Fig. 8 is front face view of the cutting head of the apparatus, taken on line 8—8 of Fig. 7;

Fig. 9 is a sectional view of the cutting head, taken on line 9—9 of Fig. 8;

Fig. 10 is a sectional view taken on line 10—10 of Fig. 8 and illustrating the cutting tool assembly for the spider trunnion end bearing face;

Fig. 11 is a sectional view taken on line 11—11 of Fig. 8 and illustrating the cutting tool assembly for shaping the cylindrical bearing face and seal-engaging surface of the spider trunnion;

Fig. 12 is a greatly enlarged view of the cutting tools, including a drill, carried by the cutting head, and illustrating their positions at the completion of their machining operation on the trunnion of a spider forging;

Fig. 13 is a view taken on line 13—13 of Fig. 12;

Fig. 14 is a greatly enlarged view, similar to Fig. 12, but illustrating a position of the cutting tools, in relation to the spider trunnion, during the machining operation;

Fig. 15 is an end view of the cutting tool for shaping the cylindrical bearing face and seal-engaging surfaces of the spider trunnion, taken on line 15—15 of Fig. 13.

Fig. 16 is an end view of the cutting tool forming the end bearing face of the spider trunnion, taken on line 16—16 of Fig. 13;

Fig. 17 is greatly enlarged face view of the spider-holding and locating fixture of the indexing mechanism, and the spider forging engaged therewith;

Fig. 18 is a sectional view of the fixture and spider shown in Fig. 17 and taken on 18—18 of Fig. 17;

Fig. 19 is a side view of a spider forging, prior to the cutting operations on the trunnions thereof; and Fig. 20 is a side view of the spider forging after the cutting operations on the trunnions thereof.

Figure 21:
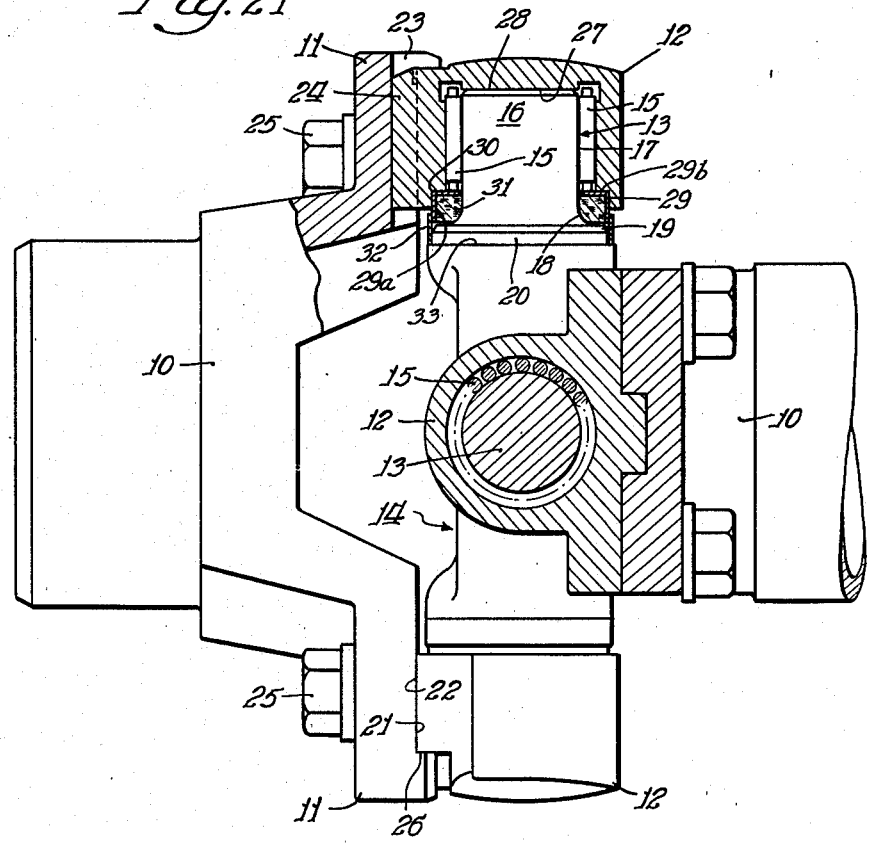
Fig. 21 is a side view of a universal joint showing one trunnion bearing in longitudinal cross-section and another in transverse section.

The present method and apparatus is directed to the manufacture of spiders or cross members for universal joints of the Cardan type, an example of which is shown for purposes of illustration in Fig. 21 and embodies the structural features disclosed in Swenson Reissue Patent 21,507, issued July 9, 1940, and Swenson Patent 1,985,531, issued December 25, 1934. The difficult problems in the manufacture of spiders for universal joints can best be exemplified by consideration of the universal joint structure in Fig. 21, wherein a pair of yokes 10 have spaced arms 11 connected to bearing cups 12 receiving pairs of diametrically opposed or four trunnions 13 of a spider 14, and attached to the arms 11 of the yokes 10. A plurality of roller bearings 15 are disposed between the trunnions and the bearing cups. The spider trunnions are spaced 90° apart with their axes located in a plane intersecting the axis of rotation of the spider and have an inner wall 16 providing a cylindrical bearing portion 17 and a base portion 18 flaring outwardly into an integral shoulder 19 and a cylindrical outer wall 20. The roller bearings 15 engage the cylindrical bearing portions 17 of the spider trunnions and the inner cylindrical bearing surfaces of the bearing cups. The yoke arms 11 have surfaces 21 for abutment with flat faces 22 on the cups and have milled slots 23 receiving lugs 24 on the cups, each yoke arm having holes aligned with threaded holes in the cups and receiving bolts 25 to hold the cups and yoke arms in assembly. The yoke arms 11 are provided with arcuate pilot shoulders 26 to engage arcuate surfaces on the cups 12, the arcuate shoulders being machined concentric to the axis of the yokes to support the cups at the same distance from center and in a truly radial plane and also to insure the proper clearance of between .001 and .005 inch to prevent binding of the flat end thrust bearing surfaces 27 on the cups with respect to the thrust bearing surfaces 28 of the ends of the trunnion 13 of the spider 14 to support and operatively retain the roller bearings between the trunnions and bearing cups. To retain lubricant in the joint, each bearing cup is provided with a retainer ring 29 pressed into a counterbore 30 of the bearing cup and includes a cylindrical skirt portion 29a and a radially, inwardly extending flange 29b together cooperating with the inner trunnion wall to define a substantially closed annular space receiving a cork packing ring or seal 31, with the radial flange 29b extending across the annular space between the bearing wall surfaces to support the ring against extruding into the roller bearing space and to prevent the roller bearings from longitudinal movement. The packing ring 31 is compressed into sealing contact with the cylindrical and flared portions of the inner trunnion wall. A ring or collar 32 is engaged with the shoulder 19 of the trunnion, having a pressfit connection with the cylindrical outer wall 20 with its end in abutment with a shoulder 33 defining the end of the cylindrical wall 20, and functions in cooperation with the skirt portion 29a of the ring 29 to prevent the entrance of dirt and water.

In the above-described universal joint and all other universal joint assemblies of the type utilizing a spider or cross member, it is critical to the assembling and operation of the universal joint that the spider be accurately machined from its rough forging state so as to be centered with respect to the yoke axis to prevent unbalance of the shafts, connected to the yokes, tending to cause wobbling of the shafts, and preloading of the spider trunnions with consequent noise, and galling generating heat consuming the lubricant with consequent considerable friction resulting in the rapid and undue wear of the bearing surfaces of the trunnion and bearing cups with consequent shortening of the life of the universal joint. It is also necessary that the spider trunnions be accurately machined to provide close tolerances between the mating parts of the spider and bearing cups for substantially eliminating end play of the spider in the bearing cups, as well as providing an adequate seal between the relatively rotatable bearing cups and the spider trunnion shoulders. In the close and critical machining tolerances required to produce satisfactory spiders, it is essential to coincide the axes of the trunnions in a single plane and positioned 90° apart with the end bearing surfaces on the trunnions being equidistantly disposed from the axis of the spider and, equally important, to provide the proper diameters and correct axial locations of the cylindrical bearing surfaces of the trunnions with respect to the comparable dimensions of the bearing cups and their location and disposition with respect to the yoke arms. In addition, as the axis of the spider with respect to the yoke axis is displaced in a universal joint, the dynamic balance of the universal joint may be seriously disturbed so that the forces encountered in the rotation of the universal joint and angular displacement of the universal joint shaft in operation will cause noise and excessive wear rapidly. The ends of the trunnions must have their end bearing surfaces accurately located a predetermined distance from the axis of the joint to insure a predetermined clearance with respect to the flat bearing surfaces on the bearing cups to prevent binding and to allow free movement of the parts and also to relieve the bolts, securing the bearing cups to the yokes, of the load incident to end thrust. While means are provided in the above-described universal joint for affording end clearances of the ends of the trunnions from the flat bearing surfaces of the bearing cups, these means only provide certain limits of tolerances and assume the accurate machining of the ends of the trunnions, so that the end surfaces thereof are located predetermined and fixed distances from the axis of the spider. Also, in a universal joint, as described, it is important to maintain the cylindrical surface on the base of the trunnion in axial alignment with the axis of the trunnion to insure that the protective collar does not engage the retainer for the cork seal ring, because, if the cylindrical surface is eccentric to the axis of the trunnion, the collar will scrape against the retainer with consequent noise and wear and also provide a wide gap between the collar and the retainer permitting water and dirt to enter.

The present invention is directed to providing an improved and simplified method of and apparatus for the manufacture of spiders involving the performance of work operations on a rough spider forging which is accurately located for rotation about a fixed axis to position each trunnion with its axis in alignment with the axis of a reciprocating cutting head movable along the axis, the head having cutting tools positioned predetermined distances about the axis of the cutting head to machine the trunnions, during periodic indexing of the trunnions 90°, so that uniformity of dimension on all four trunnions of the rough spider forging workpiece will be obtained, namely the end bearing surface and cylindrical wall and the flared portion of the cylindrical wall, as well as the cylindrical surface at the base of the trunnion will be performed in a single operation on each trunnion. By aligning the axis of each trunnion with the axis of the cutting head and its tools disposed the proper distance from the axis of the cutting head, any possibility that the axis of the trunnion being off-center is eliminated. Due to the fact that the spider forging or workpiece is held and rotates only during the work operations on all four trunnions, transfer of the workpiece from station to station as previously had is eliminated, and this insures that the 90° angularity between the axes of the trunnions is maintained. A further factor of considerable importance is that by doing all of the work on the spider forging on one machine and using the same cutter head for machining all four trunnions on the same forging, all four machined trunnions of the spider are in a common plane.

Figure 1:
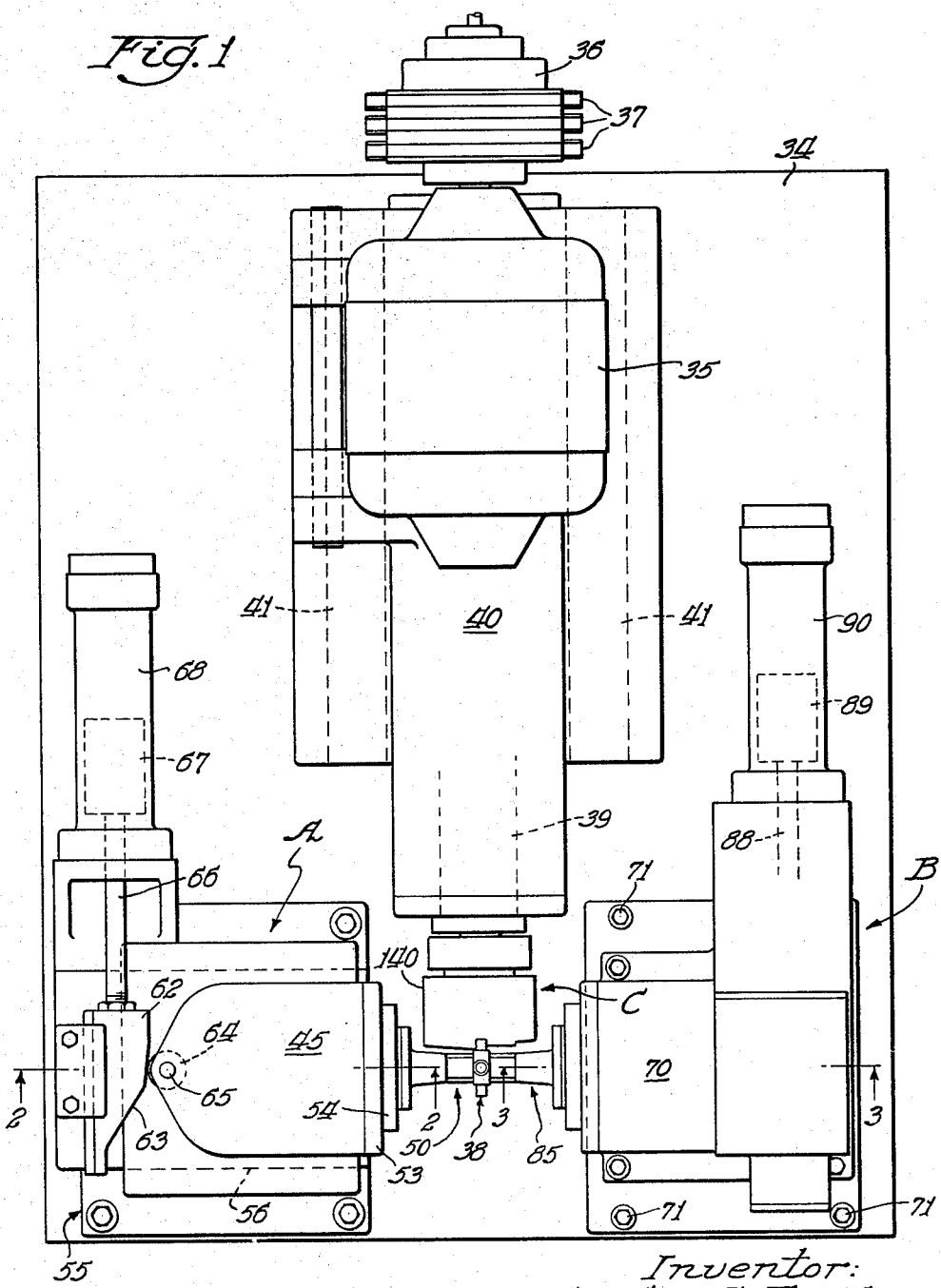
Fig. 1 is a top plan view of apparatus in which the locating, clamping, indexing and machining operations of the invention may be carried out.

Referring now more particularly to the apparatus for machining the rough spider forgings, and referring first to Fig. 1 illustrating a top plan view of the apparatus, a horizontal platform or table 34 is provided on which is mounted an electric motor 35, having a pulley 36 for rotating belts 37 connected to a pulley and a spindle 39 of the cutting mechanism. A pump (not shown) provides fluid pressure for operating a hydraulic control system (not shown) coupled to an electric control system (not shown) for providing automatic cycles for effecting a fast approach, feed, dwell and fast return of the spindle. The apparatus further comprises a clamping mechanism A, movable into and out of engagement with a spider forging 38 by a cam arrangement, the forging being engaged by an indexing mechanism indicated generally at B for periodically rotating the spider 90°. The rotatable spindle 39 is supported on the cutting mechanism C, which is mounted on a slide 40 for reciprocation of the mechanism along ways 41—41 on the table 34 for movement of the cutting tools on the cutting head into and out of engagement with the spider forging. The spindle 39 is rotatable by the electric motor for the cutting operation on the spider forging.

Referring to Figs. 1 and 2 illustrating the clamping unit A, a spindle 39a is rotatably mounted on roller bearings 42 positioned between cone-shaped races 43 and 44, respectively, engaging the housing 45 and the spindle 39a. The spindle 39a is maintained against axial movement in the housing 45 by a nut 46 threaded on to the inner end of the spindle and acting on a washer 47 cooperating with the enlarged end 48 of the spindle to urge the cone-shaped races toward each other until movement is prevented by the collar 49 disposed between the races and engaging the housing. The outer end of the spindle 39a is provided with an arbor 50 having a tongue and groove connection 51 to the spindle, the arbor being secured in any suitable manner to the spindle. A seal 52 is provided between an end cap or plate 53 and a plate 54, the plate 54 being secured to the spindle by by a threaded plug inserted into a threaded opening in the plate 54. The end cap or plate 54 is secured to the spindle housing 45 by a bolt as shown. The spindle housing 45 is reciprocably mounted upon a frame generally indicated at 55 for movement to and from the spider forging. More particularly the housing 45 has at opposite sides thereof a plurality of slide portions 56 positioned within ways on the frame for slidably supporting the spindle housing 45 on the frame. As shown in Fig. 2, the housing 45 is provided with a depending flange 57 having a threaded opening receiving one end of a shaft 58, the shaft 58 and a rod 59, fixed to the frame 55 by means of a bar 60, supporting a spring 61. The spring 61 surrounds the shaft 58 and rod 59 with one end of the spring abutting the bar 60 and the other end of the spring seating against flange 57, for moving the housing 45 to the left, as shown in Fig. 2. A cam arrangement is provided for moving the spindle housing of the clamping unit to the right and toward a spider against the pressure of the spring 61 tending to move the spindle housing to the left. The cam arrangement comprises a cam 62 slidably mounted in the frame 55 for reciprocal movement in a direction transverse to the direction of the movement of the spindle and housing of the clamping unit, as shown in Figs. 1 and 2.

As seen in Figs. 1 and 2, the cam 62 has an inclined surface 63 adapted to engage a roller 64 rotatably mounted at one end of the spindle housing on a pin 65. The cam 62 is reciprocated by a piston rod 66 connected thereto and having a piston 67 disposed within a hydraulic cylinder 68 connected to a source of fluid pressure, such as a pump (not shown). It will be apparent that, upon movement of the piston in a downward direction as shown in Fig. 1, the cam surface 63 causes the spindle housing to move towards the right to move the clamping arbor into engagement with the spider. Upon movement of the piston in an upward direction, the roller 64 will roll along the cam surface 63 due to the spring 61 acting on the housing and moving the housing with the spindle to the left to disengage the work arbor from the spider forging.

Figs. 1, 3, 4 and 5 illustrate the indexing mechanism B of the apparatus and referring first to Fig. 3, the spindle 69 is rotatably mounted in a housing 70 fixed to the table 34 as by bolts 71 (Fig. 1) with the spindle being rotatably mounted in the housing by means of conical bearings 72 positioned between the outer and the inner races 73 and 74, respectively, engaging the inner surface of the housing 70 and the outer surface of the spindle 69, a spacer collar 75 being disposed between the outer raceways. Splined to the spindle 69 is a wheel 76 having engagement on one side thereof with the race 74 and at its other side with a cam 77 which, in turn, is engaged with an index gear 78. A nut 79 is positioned at the threaded end of the spindle 69 and which cooperates with an enlarged diametrical portion 80 of the spindle to cause the gear 78, cam 77, wheel 76 and the races 74 to maintain these elements against longitudinal movement relative to the axis of the spindle and through the cooperation of the roller bearings 72 and the raceways 74 to prevent axial movement of these component parts of the index mechanism relative to the housing. A seal 81 is disposed between an end plate or cap 82, fixed to the housing, and a collar 83 fixed to the spindle by a threaded plug 84 within the collar 83 and engaging the spindle. An arbor 85 is provided with a tongue and groove connection 86 to the enlarged portion 80 of the spindle and is secured to the spindle by any suitable means. The spindle is adapted to be rotated by the index gear 78 secured thereto by a rack 87 connected to a piston rod 88 (Figs. 1 and 4) operative by piston 89 in a cylinder 90 under the action of fluid pressure admitted to the cylinder from a source of fluid pressure, such as a pump (not shown).

Referring to Fig. 4, the gear 78 has diametrically opposite flat edges 91 which can successively engage with a flat surface 92 of the rack 87 and, during which time, the rack may move relative to the gear without effecting rotation thereof inasmuch as the teeth on the rack and on the gear will be out of mesh with each other at such time. The index wheel 76 is provided with pairs of diametrically opposite openings 76a for receiving spring pressed plungers 93 extending through aligned openings in the index cam 77 and the index gear 78, the plungers 93 being urged toward the openings in the index wheel by springs 94 seated at one end against their retaining ring 95 disposed between a thrust bearing 96 and the gear 78, as shown in Fig. 3. The index cam 77, illustrated in Figs. 4 and 6, has diametrically opposed raised portions 98 and dwell portions 98a as indicated in Fig. 4 adapted to engage one end of a plunger 99 reciprocally mounted in the housing, as shown in Figs. 4 and 5, the plunger 99 having an opening 100 within which is positioned a spring 101 having its outer end abutting against the rear wall 102 of the housing. The side of the plunger is provided with a recess within which is received one end of an actuating lever 103 confined within the recess in the plunger 99 by a plate 104. The lever 103 is pivotally supported on the housing by a pin 105 and has its lower end extending downwardly at one side of the piston rod 88 in spaced relation thereto and spaced a sufficient distance therefrom to permit the rack 87 to move toward the left (Fig. 4) without contacting the lower end of the lever. The lever may be actuated to rotate in a counter-clockwise direction by a stop 106 secured by a bolt 107 to the rack, as shown in Fig. 5, with the stop projecting outwardly from one side of the rack to engage the lower end of the lever when the rack is moved to the right (Fig. 4) sufficiently far to contact and rotate the lever upon actuation of the piston and the rod connected to the rack. Referring to Figs. 3 and 4, the index wheel 76 is provided with a plurality of notches 108, spaced about the wheel 90° apart from each other and dividing the outer periphery of the wheel into four sectors 109 with each sector providing arcuate edges eccentric to the axis of rotation of the wheel with the arcuity increasing from one notch to another notch in a counter-clockwise direction. The sectors 109 are adapted to engage a pawl 110 pivotally mounted on the housing of the index mechanism by a bolt 111, as shown in Figs. 3 and 4, the pawl having its nose portion 112 adapted to extend within one of the notches 108 in the wheel 76 during rotation of the wheel by means of a spring wire 113 secured to the housing and having one end against the pawl to urge the nose of the pawl into the notches upon rotation of the wheel in a counter-clockwise direction to prevent rotation of the wheel. The notches in the wheel are also adapted to accommodate the end of the spring-pressed plunger 99 upon rotation of the actuating lever 103 in a counter-clockwise direction to move the nose of the plunger 99 into one of the notches in the index wheel.

The arbor of the indexing unit B and the arbor of the clamping unit A are each provided with spider-engaging ends designed to hold and position a rough spider forging 38 during the work operation thereon by the cutter head C. More particularly, the clamping unit has the arbor 50 and the index unit has the arbor 85 fixed to the spindles thereof in any suitable manner to rotate with the spindles of the clamping and indexing unit. For purposes of illustration, reference is made to Figs. 17 and 18, illustrating the arbor 85 of the indexing unit, and inasmuch as the heads of both the clamping unit and the indexing unit arbors are identical, an explanation of head 85 of the indexing unit should suffice. The rough spider forging 38 is illustrated in Figure 19 prior to any work operations thereon by the apparatus. The spider has a body portion 38a and at each side thereof and merging with a central wall 38b thereof a plurality of protuberances 38c at the base of each trunnion 38d, each of these protuberances forming a portion of a sphere and the protuberances cooperating with the arbors of the clamping and indexing units. As seen in Figures 17 and 18, the arbor 85 of the indexing unit has its end face provided with a plurality of grooves 85a spaced 90° from each other to receive the protuberances 38c on the adjacent side of the spider forging, and it will be noted that each of these grooves 85a is formed as a portion of a frustrum of a cone with the surfaces extending in a direction designed to intersect the axis A of the spider forging and the axes of the spindles of the clamping and indexing units, so as to align these axes for the cutting operation to be performed upon the spider forging. It will be apparent that, upon the positioning of the spider forging between the arbors of the clamping unit and indexing units, the surfaces of the grooves of the arbors will cooperate with the spherical surfaces of the protuberances of the spider forging to accurately align the axes of the spider forging and the spindles of the clamping and indexing units so that the three axes will be in alignment.

Figs. 7 to 11, inclusive, illustrate details of the cutting mechanism C of the apparatus shown in Fig. 1, including the rotatable spindle 39 having a cutter head body 140 provided with a central axial opening receiving a sleeve 141 having a longitudinal passage for a drill 142 secured therein by a set screw 143 threaded into a passage in the cutter head body 140 and received within a slot in the sleeve 141 to clear the point of the set screw for clamping the drill in position in the sleeve. The sleeve 141 is fixed to the cutter head body to rotate therewith, the drill extending outwardly of the sleeve for drilling a hole in the end face of one of the spider forging trunnions, as shown in Figs. 7 and 8. The cutter head body has affixed thereto, at one side of the drill, an elongate rectangular-section forming and facing tool, identified generally at 144, adapted to machine the end bearing faces 28 of the spider forging trunnions and to provide on each trunnion a reduced shoulder portion between the bearing face 28 and the cylindrical bearing portion 17 of the trunnion. The cutter head body has also fixed thereto a combination facing and chamfering tool 145 at the opposite side of the drill and designed to form the cylindrical bearing portion 17 and the seal-engaging flared base portion 18 at the bottom thereof defining the shoulder 19 at the base of the trunnion and also the cylindrical outer wall 20 at the base of the trunnion for positioning the collar 32 for the seal.

More particularly, the cutting tool 144 is held on the cutter head body 140 by a combination of parts including a plate or spacer 146 having a keyed connection 147 (Fig. 9) to the cutter head body 140 and to a block 148 keyed as at 149 to rotate with the plate 146 and having a slot therein for receiving the tool 144, a wedge 150 and spacer 151. The tool 144 is confined in the block 148 and held in the proper cutting position with respect to the end of the trunnion by the adjustable wedge 150 and screws 152 tapped into the block 148 and engaging the tool, as shown in Figs. 8, 9 and 11, to provide set screws for permitting longitudinal adjustment of the tool 144. Bolts 153 extend through the tool block 148 and the spacer or plate 146 into the cutter head body for retaining the plate 146, tool block 148 in assembly with the cutter head body and for rotation therewith.

Referring to Fig. 11, the combination facing and chamfering tool 144 is positioned on wedge 150 adapted to adjust the tool for sizing the work trunnions and to end dimensions, the edge having one side thereof engaging spacer 151 with the sloping other side thereof engaging the lower end of the facing tool 144, as shown in Fig. 11. The spacer 151 is held against movement by its keyed connection 154 to the spacer 146, which in turn is keyed at 149 (Fig. 9) to the cutter head body. A screw 155 is utilized to adjust the wedge in proper relation to the tool 144 and is screw-threaded into the tool block 148, as shown in Fig. 8 to insure that the wedge retains the tool 144 in proper cutting relation to the spider forging trunnion. The spacer 146 may be changed and is effective to accommodate different sizes of work, and the key 147 is effective to locate the spacer with respect to the cutter head body. Upon the wedge adjusting the tool 144 properly, the set screws 152 may then be engaged with the tool 144 to insure that the tool and wedge are securely held in the tool block during the cutting operation.

Referring to the tool 145, this tool is held within a tool block 156 by four screws 157 extending through the tool block and threaded into the cutter head body to securely hold the block in engagement with the cutter head body. The tool block 156 is adjustable for positioning the tool 145 in proper relation to the trunnion for sizing the work-part trunnion diameter, this tool block being longitudinally adjustable by a key 158. The tool 145 may be moved to and from the workpiece trunnion by its disposition within a slot 159 in the tool block 156 by a wedge arrangement shown in Fig. 10, a wedge 160 having a sloping side 161 in complementary engagement with a side of the tool 145. Bolts 162 extend through an opening in the wedge 160 and are threaded into the tool block 156 to urge the wedge into clamping engagement with the tool to hold the tool in proper cutting position with respect to the trunnion. The tool has a threaded passage 163 formed therein receiving an adjustable stop screw 164 to compensate for the sharpening of the tool, and a set screw 165 is threaded into an opening in the tool block 156 for engagement with the stop screw to provide a permanently located stop for positioning the tool for end location with respect to the trunnion. The cutting end of the tool is located at 5° below the center line of the work trunnion to obtain the back clearance in cutting. After sharpening, the adjustable stop screw is pre-set to a predetermined dimension in a bench fixture before assembly to the tool block 156.

Referring now to Figs. 12, 13, 14, 15 and 16, and assuming that a rough spider forging has been positioned between and engaged by the arbors of the clamping and indexing mechanism and located with the axis of the trunnion $A^1$ in alignment with the axis $A^2$ of the drill 142, the cutting tools 144 and 145 will also be positioned relative to each other and to the trunnion as shown in Figs. 12, 13 and 14, illustrating the cutting operation being performed by the drill and the tool 145 and referring to Fig. 14, it will be noted that the tool 144 is approaching, but has not engaged, the end face of the trunnion. With the tools positioned from the axis of the trunnion, as shown in Fig. 14, it will be seen that the edge 145b of the cutting tool 145 is cutting the trunnion, and being the first cutting edge to engage the trunnion, reduces the diameter of the trunnion to an extent indicated in Fig. 14, to provide the cylindrical bearing portion 17 of the spider while the cutting edge 145a of the cutting tool forms a flaring or chamfered portion between the cylindrical bearing portion 17 and outer wall 38a of the spider forging 38; and the outer wall 38b of the spider forging 38; and the outer wall 38b will be subsequently reduced in diameter by the later engagement of the cutting edge 145c. This cutting operation of the trunnion continues until the correct length of the bearing portion 17 is obtained and the flaring base portion 18, shoulder 19 on the base portion, and the cylindrical outer wall 20 of the trunnion are formed, as shown in Fig. 12.

As the cutting tool head moves toward the trunnion in Fig. 14, the tool 144 will become effective through its cutting edge 144a first engaging the trunnion of the spider forging 38 to define a frusto-conical surface 14a on the trunnion end and by the action of its horizontally disposed edge 144b will reduce the length of the trunnion and face the end of the trunnion to provide the flat bearing surface 28 on the end of the trunnion, as shown in Figs. 14 and 12. The drill 142 is disposed between the cutting tools and upon movement of the cutting head will follow the cutting operation of the cutting tool 145 to drill an axial opening through the trunnion, as shown in Figs. 14 and 12, and subsequently the cutting tool 144 will face the end of the trunnion including the edge of the axial opening formed by the drill in its cutting operation.

In the operation of the machine, an electric motor is started to operate a pump (not shown) to provide hydraulic pressure for effecting operation of the pistons 67 and 89 in hydraulic cylinders 68 and 90 for motivating the indexing and clamping units A and B, and the motor 35 will operate to cause the movement and rotation of the cutter head C upon operation of a valve system controlling these functions of the cutting head and the clamping and indexing units. Referring to Figure 1, and assuming that the pistons 67 and 89 in the cylinders 68 and 90 are in their retracted positions, a spider forging 38 may be positioned on the arbor or work-holder fixed to the spindle of the indexing unit B and the spider forging is held against the head of the indexing unit spindle while a suitable valve may be manipulated to cause fluid pressure to flow to the cylinder 68 for actuating the piston 67 to thereby move the cam 62 in a downward direction to urge the clamping unit A and its arbor 50 into engagement with the spider forging, the arbor exerting pressure upon the spider forging and holding this pressure upon the spider forging during the machining operation. Fluid pressure may then be caused to flow to the cylinder 90 of the indexing unit B to actuate the piston 89 to cause the spindle 69 to rotate. When the hydraulic cylinder 90 is energized, it will pull the rack 87 to the rear (Fig. 4) and cause the index gear 78 to rotate 90° with the index cam 77 and the plungers 93 which are fastened to the index gear 78. The plungers 93 are mounted in the index gear 78 and the index cam 77 and are spring loaded as previously described. As the index cam 77 and the index gear 78 rotate, the index cam 77 will force the locating plunger 99 out of its locked position. At the same time, the spring-loaded plungers 93 will rotate the index wheel 76 90° and then the rack will continue its throwback allowing the index gear 78, which is an interrupted gear, to stop rotating and slide on one of its flat sides 91 against the flat surface 92 of the rack 87. At the end of stroke, the pawl 110 will drop into an alternate notch in the index wheel 76. Upon completion of the machining operation of one of the trunnions, the hydraulic cylinder 90 may be again energized to push the piston rod 89 forward. The index gear 78 will slide on one of its flat surfaces 91 against the flat surface 92 on the rack 87 until the gear teeth mesh causing the index gear 78, index cam 77, and plunger 93 to rotate 90° in reverse. The pawl 110 will prevent the index wheel 76 from rotating in reverse. During the time of this reverse index, the index cam 77 will allow the locating plunger 99 to come forward and meet the outside edge of the index wheel 76 and then slide against that edge until one of the notches 108 in the index wheel 76 lines up with the locating plunger 99, when the locating plunger will be forced into the notch by the spring 101 in the plunger. The stop 106, fastened to the rack 87, will then contact actuating lever 103, forcing the actuating lever back and causing the top part of the actuating lever to go forward. The top part of the actuating lever is seated in the slot on the locating plunger providing a positive lock when the plunger is forced into the notch on the index wheel 76. At the same time, during this cycle, the plungers 93 will rotate with the index gear 78 and the index cam 77 and drop into the next pair of notches on the index wheel ready for the next indexing operation. The above operations are continued until all four of the trunnions of the spider forging have been machined, at which time suitable valve operation by fluid under pressure flows to the clamping hydraulic cylinder 68 to energize the piston 67 for its return stroke to pull the cam 62 back, and the compressed springs 61, under the clamping unit, will move the clamping unit in a direction releasing the spider from the arbors. The machine is then ready for loading of another rough spider forging and a repetition of the cycles described above.

It will be apparent from the foregoing description that the apparatus and method for manufacturing spiders insures that there is coincidence of the axes of the trunnions in a single plane with the axes of the trunnions being positioned 90° apart and with the end bearing surfaces on the trunnions being equidistantly disposed from the axis of the spider. In addition, the proper diameters and the correct axial location of the cylindrical bearing surfaces of the trunnions are obtained with respect to the comparable dimensions of the bearing cups in their location and disposition on the trunnions. Also, the spider trunnion is dynamically balanced in a manner which will insure the dynamic balance of a universal joint, assuming that the other portions of the universal joint are dynamically balanced. The important features of the invention reside in combining all of the cutting tools into one cutter head and by positioning the rough spider forging between the index and clamping units and indexing the rough spider forging four times, all four of the trunnions are machined with the same cutter head and tools thus obtaining uniformity of dimension on all four trunnions of the same workpiece. As the work operations of the trunnions are performed at one station, all four trunnions are in the same plane with their axes disposed 90° apart and with the aligned axes of diametrically opposed trunnions being disposed 180° apart from the aligned axes of the other diametrically opposed trunnions. As the axes of the indexing unit and clamping unit are aligned with the axis of the spider, and the cutting head axis is aligned with the axis of the trunnion on which the machining operations are performed, all of the trunnion axes will be in the same plane and truly perpendicular to the axis of the spider. Furthermore, all problems previously encountered relating to off-center conditions between the trunnions on the work pieces will be eliminated.

From the foregoing description, it will be apparent that I have attained the objects of my invention. While this invention has been described in detail in its present preferred form or embodiment, I wish it to be understood that various changes and modifications may be made therein without departing from the spirit or scope thereof. It is aimed in the appended claims to cover all of such changes and modifications.

I claim:

1. The method of manufacturing a universal joint spider, having a body portion and pairs of diametrically oppositely extending trunnions with each trunnion having an axially extending hole in the outer end thereof, an outer flat end face, and cylindrical inner and outer walls radially spaced and coaxial with the trunnion axis with said inner wall having a portion flaring outwardly and merging with said outer wall to define a shoulder comprising the steps of locating the body portion of a spider forging for rotation about an axis normal to a plane containing the trunnions thereof; holding the body portion of the spider forging for rotation about said axis; providing a cutting head rotatable about and movable along an axis intersecting the axis of rotation of the spider forging and having a plurality of cutting tools fixed thereto including a facing tool and a drill in proximity to the outer end of a trunnion of the spider forging with the facing tool having a cutting edge extending radially of an axis aligned with the axis of the trunnion and the drill having its axis aligned with the axis of the trunnion, and a forming tool positioned at the outer end of the trunnion of the spider forging and having cutting portions on one edge thereof radially spaced at different distances from an axis aligned with the axis of the trunnion and including spaced first and second cutting portions extending parallel to the aligned axis with the first portion being spaced a greater distance than said second portion, and a curved arcuate portion intermediate said first and second portions; rotating said cutting head while moving the same along the axis of said trunnion to successively engage said first cutting portion, said curved portion and said second cutting portion of said forming tool with said trunnion to provide the coaxial cylindrical walls including said flared portion of said inner wall to define said shoulder on said trunnion, and to engage said drill with the trunnion end to form the axially extending hole in the trunnion end while engaging said cutting edge of said facing tool with the end of the trunnion to form the flat end face of the trunnion; and periodically rotating the spider forging about the axis normal to the plane of the spider trunnions to position each trunnion with its axis disposed at 90° to the axes of the adjacent trunnions and to present each trunnion to the cutting tools and drill for the performance of the aforesaid cutting operations thereon.

2. The method of manufacturing a universal joint spider having a body portion and pairs of diametrically oppositely extending trunnions with each trunnion having an outer flat end face, and cylindrical inner and outer walls radially spaced and coaxial with the trunnion axis with said inner wall having a portion flaring outwardly and merging with said outer wall to define a shoulder comprising the steps of locating the body portion of a spider forging for rotation about an axis normal to a plane containing the trunnions thereof; holding the body portion of the spider for rotation about said axis; providing a cutting head rotatable about and movable along an axis intersecting the axis of rotation of the spider forging and having a plurality of cutting tools fixed thereto and spaced from the axis thereof including a facing tool in proximity to the outer end of a trunnion of the spider forging with the cutting tool having a cutting edge extending radially of an axis aligned with the axis of the trunnion, and a forming tool positioned at the outer end of the trunnion of the spider forging and having cutting portions on one edge thereof radially spaced at different distances from an axis aligned with the axis of the trunnion and including spaced first and second cutting portions extending parallel to the aligned axis with the first portion being spaced a greater distance than said second portion, and a curved arcuate portion intermediate said first and second portions; rotating said cutting head while moving the same along the axis of said trunnion to successively engage said first cutting portion, said curved portion and said second cutting portion with said trunnion to provide the coaxial cylindrical walls including said flared portion of said inner wall to define said shoulder on said trunnion; and to engage said cutting edge of said facing tool with the end of the trunnion to form the flat end face of the trunnion; and periodically indexing the spider forging to rotate the forging about the axis normal to the plane of the spider trunnions to position each trunnion with its axis disposed at 90° to the axis of the adjacent trunnion and to present to the cutting tools for the performance of the aforesaid cutting operations thereon.

3. The method of manufacturing a universal joint spider having a body portion provided with pairs of diametrically oppositely extending trunnions with each trunnion having an outer flat end face, and a radially spaced cylindrical wall and with the end faces of the trunnions being located equidistantly from the axis of the spider and the cylindrical walls having their axes in a common plane and radially spaced 90° from each other about the spider axis comprising the steps of locating the body portion of a spider forging for rotation about an axis normal to a plane containing the trunnions thereof; holding the body portion of the spider for rotation about said axis; providing a cutting head rotatable about and movable along an axis intersecting the axis of rotation of the spider and having a plurality of cutting tools fixed thereto including a facing tool in proximity to the outer end of a trunnion of the spider forging with the cutting tool having a cutting edge extending radially of an axis aligned with the axis of the trunnion and a forming tool fixed to the head and positioned at the outer end of the trunnion of the spider forging and having a cutting edge radially spaced from an axis aligned with the axis and extending parallel to the aligned axis; rotating said cutting head while moving the same along the axis of said trunnion to successively engage said cutting edge of the forming tool with said trunnion to provide the cylindrical wall on said trunnion; and to engage said cutting edge of the facing tool with the end of the trunnion to form the flat end face of the trunnion; and periodically rotating the spider forging about the axis normal to the plane of the spider trunnions to position each trunnion with its axis disposed at 90° to the axes of the adjacent trunnions and to present to the cutting tools for the performance of the aforesaid cutting operations thereon.

4. The method of manufacturing a universal joint spider having a body portion and pairs of diametrically oppositely extending trunnions with each trunnion having a cylindrical wall radially spaced and coaxial with the trunnion axis and having a portion, at the juncture of the trunnion and spider body portion, flaring outwardly and merging with said wall to define a shoulder comprising the steps of locating the body portion of a spider forging for rotation about an axis normal to a plane containing the trunnions thereof; holding the body portion of the spider forging for rotation about said axis; providing a cutting head rotatable about and movable along an axis intersecting the axis of rotation of the spider forging and having a cutting tool positioned at the outer end of the trunnion of the spider forging and having a first cutting portion on one edge thereof radially spaced from and parallel to an axis aligned with the axis of the trunnion and a second curved arcuate cutting portion adjacent said first portion; rotating said cutting head while moving the same toward said trunnion to successively engage said second curved cutting portion and said first cutting portion of said tool with said trunnion to provide the cylindrical wall including said flared portion of said wall; and periodically rotating the held spider forging about the axis normal to the plane of the spider trunnions to position each trunnion with its axis disposed at 90° to the axes of the adjacent trunnions and to present each trunnion to the cutting tools for the performance of the aforesaid cutting operations thereon.

5. The method of manufacturing a universal joint spider, from a forging having a body portion and pairs of diametrically oppositely extending trunnions, to provide each trunnion with cylindrical inner and outer walls radially spaced and coaxial with the trunnion axis with said inner wall having a portion flaring outwardly and merging with said outer wall to define a shoulder comprising the steps of positioning and holding the body portion of the spider forging for rotation about an axis normal to a plane containing the trunnions thereof; rotating and moving a plurality of cutters about and along an axis aligned with the axis of a trunnion to successively engage the cutting tools with the trunnion to provide the coaxial cylindrical walls including said flared portion of said inner wall to define said shoulder on said trunnion, and to form the axially extending hole in the trunnion end while forming the flat end face of the trunnion; and periodically indexing the spider forging to rotate the spider forging 90° about the axis normal to the plane of the spider trunnions to position each trunnion with its axis disposed at 90° to the axes of the adjacent trunnions and to present each trunnion to the cutting tools and drill for the performance of the aforesaid cutting operations thereon.

References Cited in the file of this patent

UNITED STATES PATENTS

| | | |
|---|---|---|
| 190,042 | Hurd | Apr. 24, 1877 |
| 612,412 | Grohmann | Oct. 18, 1898 |
| 1,742,193 | Bell | Jan. 7, 1930 |
| 2,358,608 | Turner | Sept. 19, 1944 |
| 2,596,484 | Hunziker | May 13, 1952 |

UNITED STATES PATENT OFFICE
CERTIFICATION OF CORRECTION

Patent No. 2,961,764　　　　　　　　　　　　　　　　November 29, 1960

Gustav A. Frojd

It is hereby certified that error appears in the above numbered patent requiring correction and that the said Letters Patent should read as corrected below.

Column 5, line 67, after "diametrically" insert -- opposed --; column 8, lines 52 and 53, strike out "and the outer wall 38b of the spider forging 38;".

Signed and sealed this 9th day of May 1961.

(SEAL)
Attest:

ERNEST W. SWIDER
Attesting Officer

DAVID L. LADD
Commissioner of Patents